(12) United States Patent
Lenoble

(10) Patent No.: US 9,561,523 B2
(45) Date of Patent: Feb. 7, 2017

(54) CONTROLLED RADICAL ASSISTED POLYMERIZATION

(71) Applicant: Luxembourg Institute of Science and Technology (LIST), Esch-sur-Alzette (LU)

(72) Inventor: Damien Lenoble, Eprave (BE)

(73) Assignee: Luxembourg Institute of Science and Technology (LIST), Luxembourg (LU)

( * ) Notice: Subject to any disclaimer, the term of this patent is extended or adjusted under 35 U.S.C. 154(b) by 57 days.

(21) Appl. No.: 14/370,902

(22) PCT Filed: Jan. 9, 2013

(86) PCT No.: PCT/EP2013/050325
§ 371 (c)(1),
(2) Date: Jul. 7, 2014

(87) PCT Pub. No.: WO2013/110502
PCT Pub. Date: Aug. 1, 2013

(65) Prior Publication Data
US 2015/0147475 A1    May 28, 2015

(30) Foreign Application Priority Data

Jan. 25, 2012  (LU) .......................... 91934

(51) Int. Cl.
*A23G 3/20* (2006.01)
*B05D 1/34* (2006.01)
(Continued)

(52) U.S. Cl.
CPC . *B05D 1/34* (2013.01); *B05B 1/14* (2013.01); *B05D 1/02* (2013.01); *B05D 3/0493* (2013.01);
(Continued)

(58) Field of Classification Search
CPC ............. B05D 1/34; B05D 1/02; B05D 3/107; B05D 1/14; B05D 3/0493
(Continued)

(56) References Cited

U.S. PATENT DOCUMENTS

2008/0187663 A1* 8/2008 Affinito .................... B05D 1/34
427/255.28
2008/0233435 A1 9/2008 Hasegawa et al.
(Continued)

FOREIGN PATENT DOCUMENTS

EP             2168691 A1   3/2010
GB    EP 2168691 A1 *   3/2010  ............... B05D 1/60
(Continued)

OTHER PUBLICATIONS

International Search Report from corresponding International Application No. PCT/EP2013/050325, mailed Apr. 3, 2013.

*Primary Examiner* — Kelly M Gambetta
(74) *Attorney, Agent, or Firm* — Polster Lieder

(57) ABSTRACT

The present invention is directed to a method of forming a polymer coating on a substrate. The method comprising the steps of providing in an evacuated reaction chamber a substrate having a surface to be coated; and providing a first source of polymer forming material and a second source of radicals. According to the invention the first source and the second source are separated from each other and from the reaction chamber, and the polymer forming material as well as the radicals are, at least temporarily, conducted contemporaneously but spatially separated to the substrate's surface, so that a reaction of the polymer forming material with the radicals is avoided before they reach the substrate's surface. Further, the present invention is directed to a device for carrying out the method according to the invention.

13 Claims, 2 Drawing Sheets

(51) Int. Cl.
*B05D 3/04* (2006.01)
*B05D 1/02* (2006.01)
*C08J 7/16* (2006.01)
*C08J 7/04* (2006.01)
*B05B 1/14* (2006.01)
*B05D 3/10* (2006.01)
*H05H 1/24* (2006.01)
*H05H 1/32* (2006.01)
*B05D 1/00* (2006.01)

(52) U.S. Cl.
CPC ............... *B05D 3/107* (2013.01); *C08J 7/047* (2013.01); *C08J 7/16* (2013.01); *B05D 1/60* (2013.01); *H01J 2237/332* (2013.01)

(58) Field of Classification Search
USPC .................................. 118/20; 427/569, 540
See application file for complete search history.

(56) References Cited

U.S. PATENT DOCUMENTS

2010/0190341 A1* 7/2010 Park .................. C23C 16/045
                                                     438/694
2013/0161184 A1* 6/2013 Hong .................. C23C 14/22
                                                     204/192.12

FOREIGN PATENT DOCUMENTS

WO    2006097719 A1    9/2006
WO    2009011532 A2    1/2009

* cited by examiner

CONTROLLED RADICAL ASSISTED POLYMERIZATION

CROSS-REFERENCE TO RELATED APPLICATIONS

The present invention is the US national stage under 35 U.S.C. §371 of International Application No. PCT/EP2013/050325, which was filed on Jan. 9, 2013 and which claims the priority of application LU 91934 filed on Jan. 25, 2012 the content of which (text, drawings and claims) are incorporated here by reference in its entirety.

FIELD

The present invention is directed to a new method of producing polymer coatings or films.

BACKGROUND

In general it is known to prepare polymers in a liquid solution. However, such methods require in many cases the use of expensive, corrosive or toxic solvents. Further, often undesired or uncontrollable reactions take place in such a solution. Finally, after polymer formation in the liquid solution, a film or coating has to still be formed which normally requires multiple further time-consuming cleaning and deposition steps.

Another known method allowing a direct deposition of polymer films is the method of chemical vapor deposition (CVD).

One type of CVD is the method of vapor deposition polymerization (VDP). According to VDP a condensation reaction is initiated between two monomers at a surface of a substrate without using any initiator or oxidizing agent. In particular, monomers are volatilized at the surface of a temperature controlled substrate. Such a method allows polymerization of monomers which are not soluble in solvents and offers to some degree a control of generated chain lengths. However, according to the VDP it is difficult to control the monomers' concentration and their flux to the surface of the sample to be coated. In particular, there is a competition between an adsorption on the sample's surface and the formation of long polymer chains, wherein adsorption is preferred at low temperatures and the formation of long polymer chains is preferred at rather high temperatures. This is only one of the reasons for the difficulty in controlling the composition of copolymers according to this method.

Another known polymerization method is the plasma enhanced chemical vapor deposition (PECVD). This technique has mainly been used for the deposition of inorganic films at relatively low temperatures and with a high deposition rate. Unfortunately, monomers injected into the plasma chamber are ionized or fragmentized by the plasma due to electrons, ions or radicals in the plasma. Further, such plasma polymers are often irregular and have rather short chain lengths. Moreover, they are frequently cross-linked and randomly terminated. Plasma polymerization leads to a random poly-recombination of radicals and fragments of monomers. A known innovation in the field of plasma polymerization is the use of the pulsed-plasma mode. In that case, short plasma pulses (of a few microseconds) can activate molecules, produce radicals and initiate the polymerization reaction. After the pulse, the residual radicals initiate a purely chemical radical chain reaction during the plasma-off period (typically tens of microseconds). In that case, a more chemically-regular product is expected but the chain propagation during chemical polymerization is restricted by the low probability of attaching a new monomer to the radical at the growing chain-end. Moreover, the deactivation of chain propagation is expected under the usual vacuum conditions (e.g. about 10 Pa) due to the recombination of neighboring radicals. This leads to a significant loss of active radical sites during the plasma-off period. Plasma is thus re-ignited to reproduce fresh initiating radicals. The resulting polymer films have a structure and composition closer to their counterparts produced by radical polymerization in liquid phase but show repeatable irregularities induced by the plasma-on period. Such issues should be circumvented.

Another known method for depositing polymer coatings is the initiator chemical vapor deposition (iCVD). This method is based on a thermal decomposition of an initiator into free radicals assisting in initiating the polymerization of co-injected monomers. Typically the iCVD uses a network of heated filaments (e.g. between 200° C. and 550° C.) such that the initiator molecule is pyrolyzed into radicals capable of initiating a polymerization reaction. Then the radicals diffuse together with the monomers to a carrier substrate. Unfortunately, pyrolysis may also result in the degradation of monomers and is difficult to control. Moreover, pyrolysis of initiator material may result in further undesired ions or agents which may deteriorate the quality of the produced polymer and impede the control of polymer formation. Further, the amount of radicals and monomers reaching a substrate's surface is difficult to control. In other iCVD methods it is possible that initiators are activated by UV radiation (photo initiator CVD). However, all known iCVD methods do not allow for sufficient control of the polymerization reaction. In particular, free radicals recombine uncontrollably before deposition.

Finally, the method of oxydant chemical vapor deposition (oCVD) is known in the state of the art. In particular, a monomer reacts with an oxidant species. The oCVD uses a spontaneous reaction between the oxidant and the monomer with any energetical initiation (e.g. thermal or optical). However, the oxidants have a very low volatility and their injection into the vapor phase is a difficult problem requiring very specific reactor types.

As indicated above, known methods involve several disadvantages. In summary, they often do not allow for a satisfying control of chain lengths of formed polymers. Another issue is the degradation of polymers and/or polymer forming material which can result in the loss of the desired functional properties of the produced polymer coating. In particular, some of the above methods utilize a plasma within the reaction chamber which results in the degradation of sensitive polymers or precursors, i.e. in particular of organic material.

Moreover, it is not always possible to sufficiently control the concentration of polymer forming material in relation to initiators, thus rendering the control of layer thicknesses and chain lengths difficult.

Other methods involve multiple serial coating steps and are thus time consuming, rendering these methods rather uninteresting for mass production purposes.

The technical problem is to provide an advanced method of forming polymer coatings on substrates.

In particular, the method should allow for an improved control of polymer chain lengths, cross linking and or coating thickness.

Further, the method should be fast, easy to implement or cost-effective.

Another object of the invention is to overcome at least one of the above mentioned disadvantages.

SUMMARY

The above mentioned technical problem is solved by a method directed to forming a polymer coating on a substrate, comprising the steps of providing in an evacuated reaction chamber a substrate having a surface to be coated and providing also a first source of polymer forming material and a second source of radicals. In particular, the first source and the second source are separated from each other and from the reaction chamber. The polymer forming material and the radicals are (at least temporarily) conducted contemporaneously (at the same time) but spatially separated (distinct) to the substrate's surface, so that a reaction of the polymer forming material with the radicals is avoided before they reach the substrate's surface.

Since two separate material sources are provided, it is possible to produce a desired amount of radicals and polymer forming material (e.g. monomers) and to provide them to the substrate in the reaction chamber. By keeping polymer forming material and radicals spatially separated (e.g. by fluidly distinct conduit means), it is possible to avoid an early reaction of both source materials. The polymer forming material and the radicals react on the substrates surface. An undesired and non-monitorable or uncontrollable prior reaction in the reaction chamber is avoided. The method provides independent controls of polymer forming materials and the radicals that initiate the polymerization reaction. Further, this method leads to a pure chemical polymerization in an appropriate range of pressure and temperature initiated by independently (from the reaction chamber) created radicals. The source of radicals can, for example, be a plasma, a pyrolysis system, etc.

In various embodiments, the formed polymer is an organic polymer. Such organic compounds and corresponding source materials or precursors (e.g. monomers) are particularly sensitive and must not be destroyed or degraded during the deposition process.

Most of the scientists in the field of vapor-phase polymer growth are convinced by the possibility to "polymerize" practically any kind of gaseous or partially volatile organic precursors.

In general, it is also possible to remove the deposited coating or film from the substrate for further use.

In accordance with various embodiments, the polymer forming material is conducted or guided via first conduit means to the sample's surface to be coated and the radicals are conducted via second conduit means to the sample's surface to be coated. In other words, the polymer forming material and the radicals are each brought close to the substrate's surface to be coated.

In accordance with various other embodiments, the polymer forming material and the radicals are each sprayed essentially perpendicularly onto the sample's surface.

In accordance with yet other embodiments, the polymer forming material and the radicals are each sprayed in the form of distinct or non-overlapping streams onto the sample's surface.

By spraying radicals and polymer forming material directly onto the surface, a reaction of both materials is avoided.

In accordance with still yet other embodiments, the polymer forming material and the radicals are sprayed onto the substrate's surface in the form of essentially parallel (e.g., separate or non-overlapping) streams or jets, wherein the streams of polymer forming material and the streams of radicals are sprayed onto the substrate's surface in a spatially alternating manner. In other words each stream of polymer material can be adjacent to at least one stream of radicals, or vice versa. A stream or a jet of polymer forming material can comprise a vapor of polymer forming material. A stream or a jet of radicals can comprise also a carrier gas. For example, the carrier gas can be an inert gas or noble gas. The stream of polymer material can also comprise a carrier gas such as inert or noble gases. An alternating supply of streams to the substrate's surface allows for a homogeneous formation of the polymer coating.

In accordance with yet other embodiments, the polymer forming material and the radicals are separately conducted via conduit (conducting) means until a distance D of less than 10 cm, for example, less than 5 cm, e.g., less than 2 cm, but generally not less than 0.1 cm from the substrate's surface 2. Then, in various implementations, they are sprayed onto the surface of the substrate.

Moreover, the present invention is directed to a device for forming a polymer coating or film on a substrate's surface. In various embodiments, the device implements a method in accordance with various embodiments of the present invention disclosed herein. Such a device can comprise a reaction chamber for accommodating the substrate to be coated; a first source for providing polymer forming material (e.g. monomers or oligomers); a second source for providing radicals (e.g. a plasma source of plasma radicals); and a conduit system for contemporaneously and spatially separately conducting polymer forming material and radicals from each source to the substrate's surface to be coated, such that a reaction of the polymer forming material and the radicals is avoided before they reach the substrate's surface.

In accordance with various embodiments, the conduit system comprises fluidly separated first and second conduit means, wherein the first conduit means are in fluid communication with the first source and the second conduit means are in fluid communication with the second source. Further the first conduit means can comprise a plurality of first outlets for spraying polymer forming material onto the substrate's surface and the second conduit means can comprise a plurality of second outlets for spraying the radicals onto the substrate's surface.

In accordance with other embodiments, the first outlets and the second outlets are essentially arranged in a plane opposite to the substrate's surface to be coated.

In accordance with still other embodiments, the first outlets and the second outlets are alternatingly arranged in a plane opposite to the substrate's surface. Such a spatially alternating arrangement of first and second outlets results in a homogeneous provision of polymer forming material and radicals to the substrate's surface.

In accordance with still yet other embodiments, the conduit system comprises a first inlet in fluid communication with the first source and a second inlet in fluid communication with the second source, wherein the plurality of first outlets is only in fluid communication with the first inlet and the plurality of second outlets is only in fluid communication with the second inlet. In other words, the first and the second conduit means are not in fluid communication with each other but fluidly separated.

In accordance with yet other embodiments, the outlets are arranged such that an outlet of the plurality of first outlets is encompassed by or adjacent to at least two outlets of the plurality of second outlets, or vice versa.

In accordance with yet other embodiments, the smallest distance or normal distance from an outlet to the sample's surface is smaller than 100 mm, for example smaller than 50 mm, e.g., smaller than 20 mm but generally larger than 1 mm.

In accordance with yet other embodiments, the first conduit means and the second conduit means are adapted to supply essentially parallel flows to the outlets for spraying essentially parallel streams perpendicularly onto the substrate's surface to be coated.

In accordance with yet other embodiments, the first conduit means comprise a first comb-shaped member having a plurality of first parallel teeth and the second conduit means comprise a second comb-shaped member having a plurality of second parallel teeth, the first and second comb-shaped members' teeth engaging one another, and wherein the teeth of the first comb-shaped member comprise the plurality of first outlets and the teeth of the second comb-shaped member comprise the plurality of second outlets. This specific design of the conduit means or of the conduit system, respectively, simplifies the production of such means. Further, one of the conduit means can be exchanged without the need of changing the second means. This helps also to avoid contamination of the conduit means by different materials.

In accordance with yet other embodiments, the outlets are alternatingly arranged in the form of a honeycomb pattern or checkerboard pattern.

In general, the outlets can have any cross-section, for example a hexagonal, circular, elliptical, rectangular, triangular, star-shaped or polygonal cross-section.

All features of the above described aspects of the invention can be combined or replaced with one another.

DRAWINGS

In the following, the figures according to the embodiments of the present invention are briefly described. Further details are given in the detailed description of the embodiments. The Figures have the purpose of illustrating the invention and should not be understood in a limiting sense.

DETAILED DESCRIPTION

Figure 1:
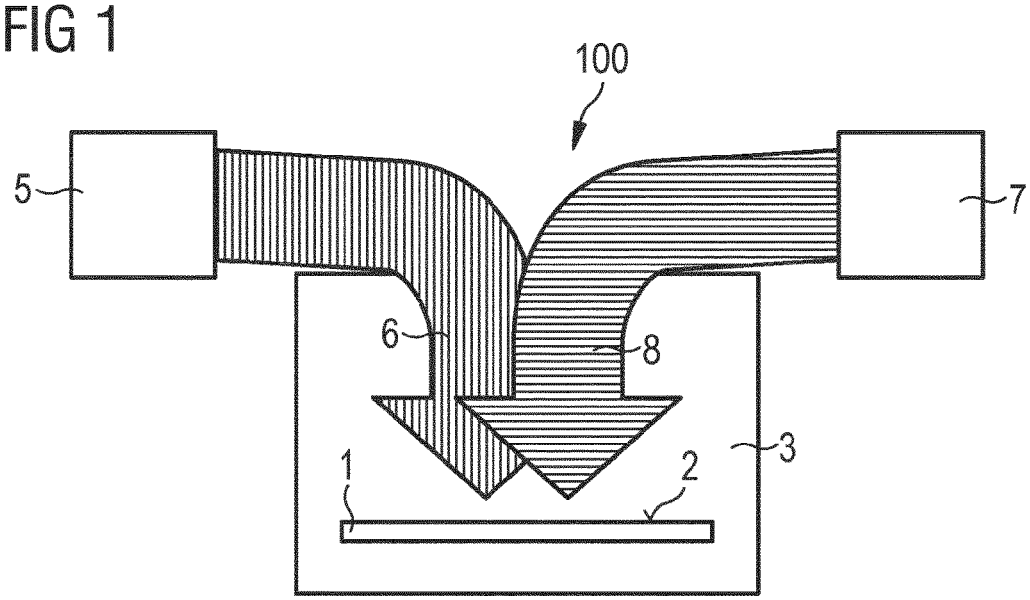
FIG. 1 depicts a schematic view of the deposition principle according to an embodiment of the present invention.

FIG. 1 schematically depicts an embodiment of a device 100 according to various embodiments the present invention. A substrate 1 to be coated is placed in a reaction chamber 3 of the device 100. Further, the device 100 comprises a first material source 5 for providing a polymer forming material 6. The first material source 5 can comprise an inert gas, as for example nitrogen or noble gazes, as well as a monomer, oligomer or precursor material 6 depending on the polymer material to be produced. Moreover, the device 100 comprises a second material source 7, i.e. a source of radicals 8.

Such a source 7 can be for instance a plasma radical source 7. However, other possibilities of providing radicals in a separate source 7 are appreciated, as e.g. the formation of radicals 8 via radiation or heating systems. As already described above with respect to the prior art, radicals can assist or trigger the polymerization of polymer forming materials 6.

In various embodiments, both sources 5, 7 can provide material 6, 8 to the substrate's surface 2 with pressures of less than 1 bar. As depicted in FIG. 1 both sources 5 and 7 are separated from each other and from the reaction chamber 3. However, both sources 5 and 7 could also be installed within the reaction chamber as long as no material from each source 5, 7 can get into the reaction chamber 3 in an uncontrolled manner. In other words, the materials 6, 8 from both sources 5, 7 are guided to the sample's surface 2 via conduit means 9, 10 but especially not via an uncontrollable diffusion through the reaction chamber 3.

Depending on the used radicals 8 and/or radical source 7, the amount of radicals 8 can for example be controlled by the time of flight through the conduit means 10. For example, it is possible to avoid the arrival of ions generated in a plasma radical source 7 by choosing the length of the conduit means 10 from the radical source 7 to the outlet 12 such that ions have already recombined to molecules (being not relevant to the polymerization process), since free ions have a shorter lifetime than radicals. Alternatively, or in addition, control can also be possible by adjusting the pressure in the conduit means 10 and/or the flow velocity through the conduit means 10.

Likewise, it is possible to control the amount of polymer forming material 6 arriving at the substrate's surface 2 by controlling the pressure and/or flow velocity through the conduit means 9.

For example, polymer forming materials 6 can comprise one or more of the following substances: EDOT, pyrole, ethyl-glycol, methanol, monoglyme, tetraglyme, nipam and propylamine. These substances can also be used to form radicals 8 in a radical source 7. This is a non-exhaustive list of materials since any kind of organic substances can be polymerized with this method.

Further, radicals 8 can also be one or more of: carbon-tetra-fluoride, di-tert-butylperoxide, hydrogen-peroxide and borontrifluoride or can be formed in source 7 from methane or ammonia. Radicals 8 can also be obtained directly from the polymer forming materials.

Produced polymer coatings or films can be for instance polymers which are obtainable from the above mentioned substances. In particular, poly-EDOT, polypyrole, poly-ethyl-glycol, polymethanol, polymonoglyme, poly-tetraglyme, polynipam and polypropylamine. However, it is emphasized that the above listed materials or substances have merely been mentioned for the sake of illustration but must not be understood in a limiting sense. The principle of the invention can be applied to a vast variety of materials and substances falling under the scope of the present disclosure.

Figure 2:
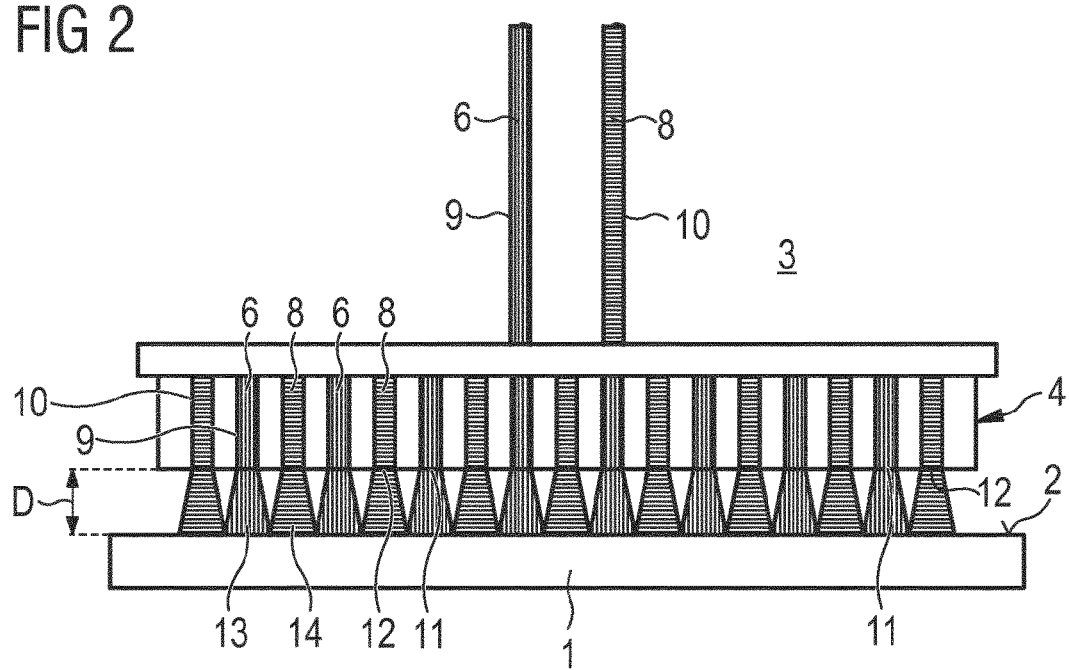
FIG. 2 depicts a schematic lateral view of the deposition process and the respective conduit system.

In various embodiments, a mode of providing the sample's surface 2 with radicals 8 and polymer forming material 6 is depicted in FIG. 2. The depicted conduit system 4 allows a determined or defined application of polymer forming material 6 and radicals 8 to the substrate's surface 2. The conduit system 4 can comprise the first conduit means 9 for conducting or guiding the polymer forming material 6 from the first source 5 to first outlets 11, and second conduit means 10 for conducting or guiding the radicals 8 from the second source 7 to second outlets 12. Thus, the flows of polymer forming material 6 and radicals 8 are (fluidly) separated from each other in the conduit system 4.

In general, the conduit means 9, 10 can be provided in the form of channels or lines. Such channels can have any cross shape as for example circular, ovoid, or polygonal.

Furthermore, the conduit system 4 and/or conduit means 9, 10 can be heatable, wherein the temperature of the surface 2 to be coated is chosen lower than the temperature of the conduit means 9, 10 and in particular of the outlets 11, 12, so as to promote condensation of polymer forming material 6 on the substrate's surface 2.

Thus, the reaction chamber can have a temperature of between about 0° C. and about 150° C. In various embodiments, the conduit system 4 is heatable. In various implementations, such heating can provide temperatures of up to 200° C., for example in order to avoid condensation of polymers on the surface of the conduit system 4. In various embodiments, the substrate 1 can have a temperature of between about 0° C. and about 80° C., e.g., between about 10° C. and about 60° C. However, neither the conduit system 4 nor the reaction chamber 3 shall be heated over temperatures of 170° C. in order to avoid degradation of polymers or polymer forming material 6.

In particular, a pyrolysis of polymer forming material 6 or polymers within the reaction chamber 3 or the conduit means 9, 10 is to be avoided, since such a reaction results in an uncontrollable degradation of materials, and has thus a negative impact on the formed polymer coating.

In general, the chamber 3 can be evacuated with a pressure of less than 10 mbar, e.g., in the order of between 0.1 mbar and 10 mbar. The substrate or sample 1 can have a flat shape and can have a thickness of less than 1 cm, e.g., of 0.1 μm to 3 mm. The lateral size of the sample 1 can be in the order of 1 cm to 100 cm. However, these sizes must not be understood in a limiting sense but have rather an illustrative purpose.

When polymer forming material 6 and radicals 8 are streamed through the outlets 11, 12, of the conduit system 4, they can form parallel jets or streams 13, 14 hitting perpendicularly the substrate's surface 2. The jets 13, 14 can also have a conical shape broadening when approaching the substrate's surface 2. Providing such jets 13, 14 to the surface 2 of the substrate 1 helps to avoid a reaction of polymer forming material 6 with the radicals 8 before both materials reach the substrate's surface 2.

In various embodiments, the width of the outlets 11, 12 can be between about 0.5 mm to about 30 mm and the smallest distance 0 between an outlet 11, 12 and the substrate's surface 2 can be between 3 mm and 50 mm.

The outlets 11, 12 of the conduit system 4 can be arranged essentially in a plane essentially parallel to the substrate's surface 2 to be coated. In other words, the outlets 11, 12 face the surface to be coated.

Figure 3A:
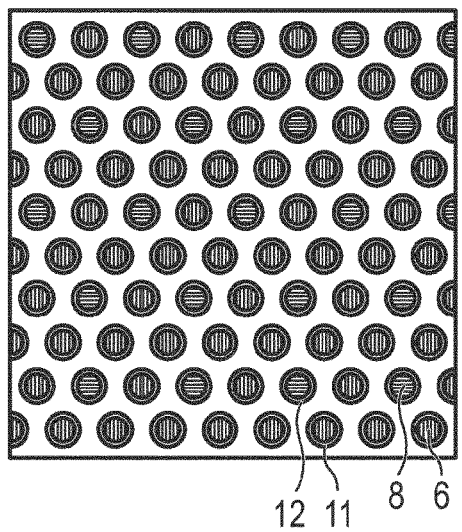
FIG. 3a depicts an arrangement of alternating circular outlets.
Figure 3B:
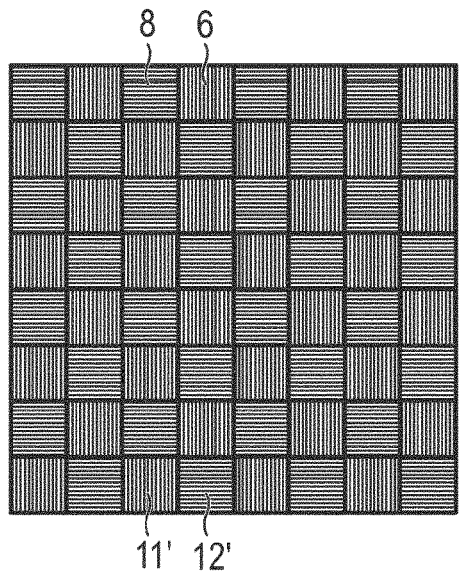
FIG. 3b depicts an arrangement of outlets arranged in a checkerboard pattern.
Figure 3C:
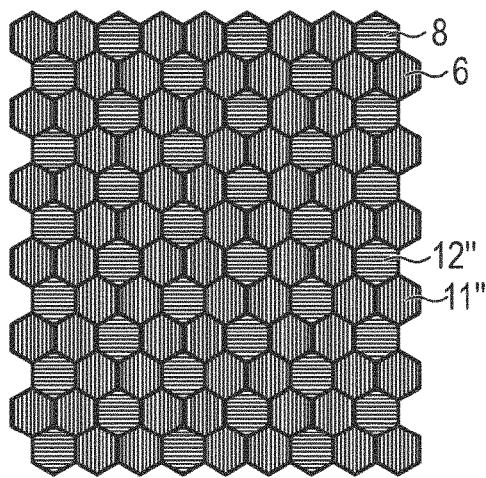
FIG. 3c depicts an arrangement of outlets in a honeycomb pattern.

FIGS. 3a to 3c depict various possible arrangements of outlets or openings 11, 12. In particular, the outlets 11, 12 can be arranged in an alternating manner in order to achieve a homogeneous supply of radicals 8 and polymer forming material 6 over the substrate's surface 2.

For example, the outlets 11, 12 can have one or more of the following cross-sections: circular (11, 12, 11''', 12'''), ovoid, rectangular (11', 12'), triangular, hexagonal (11'', 12''), polygonal, round, cross, star, slit, etc. In various embodiments, an outlet 11 for polymer forming material 6 has at least two neighbors of outlets 12 for radicals 8, or vice versa.

As depicted in FIG. 3a, the outlets 11, 12 can have a circular shape and can be arranged in lines. In general, the outlets 11, 12 can be arranged at equal distances. The arrangement of outlets 11, 12 can have essentially the form of a honeycomb pattern (see FIG. 3c) or a checkerboard pattern (see FIG. 3b), or the like.

Figure 3D:
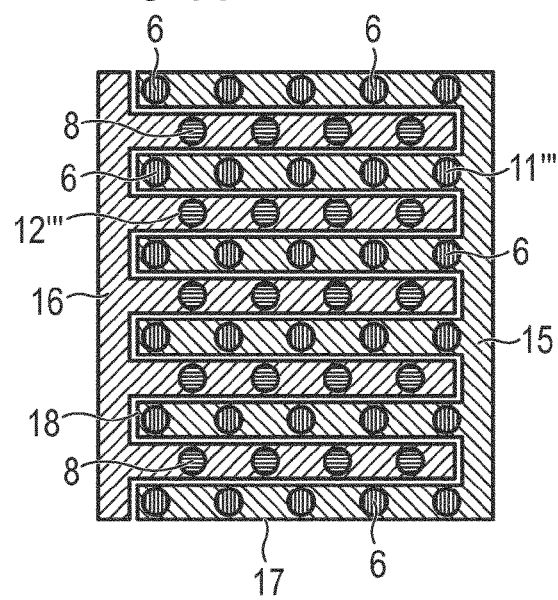
FIG. 3d depicts a comb-like arrangement of conduit means comprising outlets.

As depicted in FIG. 3d the conduit system 4 can comprise two comb-shaped (hollow) members 15, 16. Each comb-shaped member 15, 16 can be in fluid communication with only one of the sources 5, 7. For example, each comb-shaped member 15, 16 can comprise a plurality of (hollow) teeth 17, 18 being in fluid communication with one another. Each tooth 17, 18 can comprise a plurality of outlets or openings. In any case one comb-shaped member 15, 16 is adapted to apply only material of one of the sources 5 or 7 to the substrate's surface 2. In various embodiments, the teeth 17, 18 are arranged in parallel to the substrate's surface 2 and comprise openings 11''', 12''' facing the substrate's surface 2. In various embodiments, both members 15, 16 mesh or engage each other. In particular, the teeth 17, 18 of both members 15, 16 mesh or engage each other. This arrangement can substantially simplify the production of the conduit system 4. Moreover, this arrangement allows for replacing comb-shaped members 15, 16 with one another so that e.g. the position, form, and/or size of outlets can be changed. In particular, a plurality of comb-shaped members 15, 16 can be provided having each outlets 11, 12 with different cross-sections or different positions of the outlets on the teeth 17, 18.

The invention has been described with reference to best modes of carrying out the invention. Obviously, modifications and alterations will occur to others upon a reading and understanding of this specification. It is intended to include all such modifications and alterations in so far as they come within the scope of the present disclosure or the equivalents thereof.

In any case the above described embodiments shall not be understood in a limiting sense. In particular, the features of the above embodiments can also be replaced or combined with one another.

LIST OF REFERENCE SIGNS 1 substrate/sample
2 substrate's surface to be coated
3 reaction chamber
4 conduit system
5 first source/monomer source/polymer forming material source
6 polymer forming material/monomer material
7 second source/source of radicals
8 radicals
9 first conduit means
10 second conduit means
11 outlet supplied by first source
11' alternative outlet supplied by the first source
11'' alternative outlet supplied by the first source
11''' alternative outlet supplied by the first source
12 outlet supplied by second source
12' alternative outlet supplied by the second source
12'' alternative outlet supplied by the second source
12''' alternative outlet supplied by the second source
13 spray cone/stream of polymer forming material
14 spray cone/stream of radicals
15 comb-like conduit means supplied by the first source
16 comb-like conduit means supplied by the second source
100 device
D distance between outlets and the sample's surface to be coated

What is claimed is:

1. A device for forming a polymer coating on a surface of the substrate, said device comprising:
   a reaction chamber for accommodating the substrate to be coated;
   a first source for providing polymer forming material;
   a second source for providing radicals;
   a conduit system structured and operable to contemporaneously and spatially separately conduct the polymer forming material and the radicals respectively from the first and second sources to a surface of the substrate to be coated, such that a reaction of the polymer forming material and the radicals is avoided before polymer forming material and the radicals reach the surface of the substrate, wherein the conduit system comprises a first conduit means fluidly separated from a second conduit means,
   wherein the first conduit means comprises a first comb-shaped member having a plurality of first parallel, hollow teeth, and wherein the second conduit means comprises a second comb-shaped member having a plurality of second parallel, hollow teeth, where the teeth of the first and second comb-shaped members engage one another, and wherein the teeth of the first comb-shaped member comprise a plurality of first outlets and the teeth of the second comb-shaped member comprise a plurality of second outlets.

2. The device according to claim 1, wherein the first conduit means are in fluid communication with the first source and the second conduit means are in fluid communication with the second source, and wherein the first conduit means comprise a plurality of first outlets for spraying the polymer forming material onto the surface of the substrate and the second conduit means comprise a plurality of second outlets for spraying the radicals onto the surface of the substrate.

3. The device according to claim 2, wherein the first outlets and the second outlets are arranged essentially in a plane opposite the surface of the substrate to be coated.

4. The device according to claim 3, wherein the first outlets and the second outlets are arranged essentially parallel to the surface of the substrate to be coated.

5. The device according to claim 3, wherein the first outlets and the second outlets are alternatingly arranged in at least a part of the plane.

6. The device according to claim 5, wherein the conduit system comprises a first inlet in fluid communication with the first source and a second inlet in fluid communication with the second source, and wherein the plurality of first outlets is in fluid communication only with the first inlet and the plurality of second outlets is in fluid communication with only the second inlet.

7. The device according to claim 6, wherein the first and second outlets are arranged such that at least one of the first outlets is adjacent at least two of the second outlets.

8. The device according to claim 6, wherein the first and second outlets are arranged such that at least one of the second outlets is adjacent at least two of the first outlets.

9. The device according to claim 7, wherein a distance from the first and second outlet to the surface of the substrate is less than 20 mm.

10. The device according to claim 7, wherein a distance from the first and second outlet to the surface of the substrate is less than 10 mm.

11. The device according to claim 7, wherein a distance from the first and second outlet to the surface of the substrate is less than 5 mm.

12. The device according to claim 9, wherein the first conduit means and the second conduit means are adapted to supply essentially parallel flows to the respective first and second outlets for spraying essentially parallel streams perpendicularly onto the surface of the substrate to be coated.

13. The device according to claim 12, wherein at least one of:
   the outlets are alternatingly arranged in one of a honeycomb pattern and a checkerboard pattern; and
   cross-sections of the first and second outlets are one or more of hexagonal, circular, elliptic, rectangular, triangular, star-shaped and polygonal.

* * * * *